March 10, 1970  P. F. JOWITT  3,500,129
METHOD AND MEANS FOR REDUCING HAZARDS DUE TO
LOOSE STRAY OBJECTS OR ARTICLES
Filed Feb. 1, 1966

Inventor
P. F. JOWITT
By Cameron, Kerkam & Sutton
Attorneys

United States Patent Office 3,500,129
Patented Mar. 10, 1970

3,500,129
METHOD AND MEANS FOR REDUCING HAZARDS DUE TO LOOSE STRAY OBJECTS OR ARTICLES
Peter Frederick Jowitt, Farnborough, England, assignor to Minister of Aviation in Her Britannic Majesty's Government of the United Kingdom of Great Britain and Northern Ireland, London, England
Filed Feb. 1, 1966, Ser. No. 524,163
Claims priority, application Great Britain, Feb. 2, 1965, 4,428/65
Int. Cl. H02h 7/00, 1/00; B32b 7/10
U.S. Cl. 317—9                                 5 Claims

ABSTRACT OF THE DISCLOSURE

A structure for supporting or a compartment for containing movable or electrically live elements has fixed thereto, in at least one strategic position to receive and retain a stray object accidentally on its way to jam or electrically link the elements, a trap in the form of a layer of material having its underside adhesively attached to the structure or compartment and an exposed surface which can yield or deform under the weight or impact of a stray object and is sticky so that it tends to retain such an object by adhesion. The exposed surface of the trapping layer may be formed of foam or sponge plastics material, or of long hair or a heavy velvet-like pile, so treated as to render it sticky, and may be recessed to present sticky pockets for receiving objects. The underside of the trapping layer may comprise a reinforcing fabric backing strip having an adhesive surface for securing the trap in the desired position.

---

Figure 1:
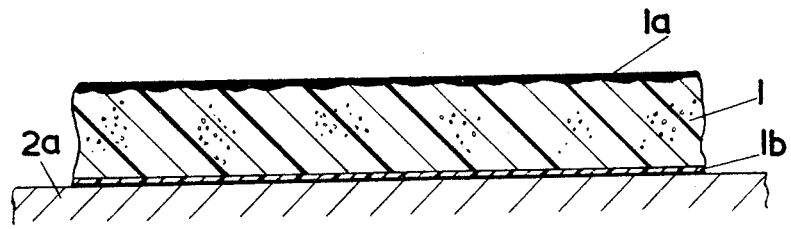

This invention is concerned with the hazard that is occasioned by loose stray objects or articles in circumstances where any such may have or gain access to moving or movable elements or electrically live elements and so interfere with or prevent, or even cause inadvertent functioning of apparatus. For example, a stray screw or any other stray metal article, may wedge in and jam moving parts or may lodge adjacent to and in some way electrically link electrical elements.

This hazard may be brought about by a great variety of foreign objects or articles, from small hand tools to particles of sand or grit, from dust or pieces of swarf or fluff to substantial component parts, and even personal items, such as pens, pen clips or pencils and buttons or pieces of clothing.

The hazard may first arise during manufacture or initial installation, or during repair and maintenance work or even during normal use or operation. It has been known for effective closure of electrical contacts to be prevented by a piece of fluff trapped between them, and loose ends or pieces of locking wire used to secure nuts to bolts against loosening can all too easily be the cause of electrical or mechanical trouble. Such troubles can be dangerous in the power plant or steering or braking mechanism of high speed vehicles and still more dangerous in any of the control mechanism of an aircraft.

Although many devices such as electrical switches may have their own individual covers which, when in position, prevent access of loose stray articles to their working parts or to their live electrical parts, the provision of such covers is not always practicable or even desirable, as for example in the case of an aircraft control run or other mechanical linkage between a movable control member and a control lever for moving it from a remote point.

According to the invention a structure for supporting or a compartment for containing movable or electrically live elements has fixed thereto in at least one strategic position to receive and retain a stray object accidentally on its way to jam or electrically link the elements, a trap in the form of a layer of material of which the exposed surface firstly can yield or deform under the weight of impact of a small stray object and secondly, is sticky so that it tends to retain such an object by adhesion.

Yielding or deformation of the sticky surface is important in order to provide a substantial and larger area of contact, and so of adhesion, to articles particularly where these are of such shape as in themselves to present a small area for contact with a flat surface as, for example, in the case of a round-headed or mushroom-headed screw.

A suitable material is a soft plastics foam or sponge with an exposed surface that is adhesive, to yield and cling to objects coming on to that surface. Furthermore, the material may be "textured" in various ways on its exposed sticky surface, to increase the exposed area and to improve the trapping of an object falling on the exposed surface in a glancing direction. The surface may be recessed, and may have a honeycomb-like or other formation presenting pockets or recesses in which small objects may be received. The material may also comprise a fur or pile fabric such as, for example, a heavy velvet or towelling or it may be like a coarse or fine brush, preferably of plastics material, the outer exposed surface of the pile being treated to render it sticky.

The material used is preferably not only yielding and sticky as described on its upper exposed surface, but also backed on its underside by a re-inforcing layer of self-adhesive strong material such as strong fabric for convenient attachment to a chosen surface. This is particularly important with foam or sponge plastics and with some other plastics because on an attempt to remove it from a surface to which it has been stuck, such material tends to tear and crumble into small pieces which are difficult to remove; the reinforcing backing allows the material, with some effort, to be peeled off the surface to which it has been stuck, leaving behind a nearly clean or readily cleanable surface for the attachment of a replacement.

The yielding and sticky material as supplied for use will usually and conveniently have its sticky trapping surface temporarily protected, in manner known for protection of sticky strip material, by a thin paper or textile fabric layer which can be peeled off when the surface is to be exposed for use. The sticky underside of the re-inforcing backing for attaching the material in position will conveniently be similarly protected.

Figure 2:
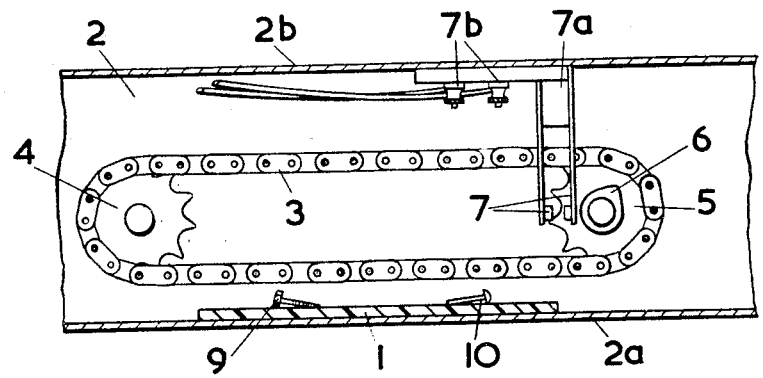

The invention is illustrated by the accompanying drawings of which FIG. 1 is a section through a strip of the trapping material adhering to a surface while FIG. 2 illustrates how the material may be used.

In FIG. 1, a layer of spongy foam plastic material 1 with its upper surface treated at 1a to render it sticky as described has its under surface 1b of a reinforcing fabric material firmly adhesively secured to the surface 2a of a structure or compartment. This material as supplied will have the upper or trapping surface 1a covered with a removable protective paper of one colour or appearance and its lower surface 1b by a protective paper of a different and distinguishing colour or appearance. If the material is not supplied pre-formed it is cut to the desired shape with the surface 1b, as distinguished by the appearance of its protection, downwards. The surface 2a to which the trap is to be attached should then be cleaned, for example by rubbing with rag containing a cleaning fluid; it is important that each area is completely freed from grease, dust, and any substance which would contaminate the adhesive. The protective paper is then peeled off the underside 1b which is then pressed firmly on to the surface 2 until it adheres securely. When the trap or all the traps are secured in place the final step consists in peeling the protective layers off the upper surfaces 1a.

In FIG. 2 there is shown by way of example, as part of an aircraft control mechanism, a chain 3 connecting a sprocket 4 to a driven sprocket 5 which carries a cam 6 which, as it revolves, actuates an electric switch 7; these movable and electrically live elements are in a compartment 2 of which the upper wall 2b may for example be the underside of the floor of the fuselage. The main body 7a of switch 7, carrying the terminals 7b, may be attached for example to the upper wall 2b. Foreign objects dropped accidentally into the casing will tend to fall on to the bottom 2a of the casing, where they may lie unnoticed beneath but in very close promimity to the chain 3. Changes of aircraft attitude, jolts due to changes of speed or direction and in particular negative g due for example to rapid descent may cause "bounce" of an object from the surface 2a into engagement with the chain 3 to jam a vital aircraft control mechanism, or into contact electrically with the switch 7, in either case with some risk to the safety of the aircraft. According to the invention a trap 1 of yielding sticky material is secured to the surface 2a in a strategic position to which objects are most likely to gravitate, in order to tend to retain there such objects as are indicated at 9 and 10. When after use in service a number of objects has been collected—and many small pieces of grit and dirt will usually be collected—or the surface stickiness has been impaired by accumulation of dust, the trap can be removed by peeling the backing 1b off the surface 2a, recleaning the surface, and fastening on a fresh trap.

I claim:

1. In a structure for supporting or containing movable or electrically live elements requiring protection against jamming or electrical linkage by loose stray objects, the combination therewith of at least one trap secured to said structure in a strategic position to receive and retain a stray object accidentally on its way to jam or electrically link the elements, said trap comprising a layer of material having its underside adhesively attached to said structure and an exposed surface which is yieldable or deformable under the weight or impact of a stray object and is sticky so that it tends to retain such an object by adhesion.

2. The combination according to claim 1 wherein the exposed surface of the trapping layer is formed of foam or sponge plastic material so treated as to render it sticky.

3. The combination according to claim 2 wherein the exposed surface of the trapping layer is recessed to present sticky pockets for receiving objects.

4. The combination according to claim 1 wherein the exposed surface of the trapping layer is formed of long hair or a heavy velvet-like pile so treated as to render it sticky.

5. The combination according to claim 1 wherein the trapping layer includes a reinforcing fabric backing strip forming the underside of said layer which is adhesively attached to said structure.

References Cited
UNITED STATES PATENTS

| | | | |
|---|---|---|---|
| 2,708,578 | 5/1955 | Mitchell | 161—406 |
| 3,039,459 | 6/1962 | Scholl | 161—167 |
| 3,087,850 | 4/1963 | Cole | 161—167 |
| 3,311,338 | 3/1967 | Culley | 161—406 |
| 3,365,353 | 1/1968 | Witman | 161—160 |

ROBERT F. BURNETT, Primary Examiner

W. J. VAN BALEN, Assistant Examiner

U.S. Cl. X.R.

156—230, 249, 598; 161—167, 406; 317—18